Patented May 12, 1936

2,040,687

UNITED STATES PATENT OFFICE 2,040,687

RESINOUS COMPOSITION

Stanley Ernest Chubb, Greet, Birmingham, England, assignor to Bakelite Limited, London, England, a British corporation No Drawing. Application November 17, 1932, Serial No. 643,124. In Great Britain November 18, 1931

1 Claim. (Cl. 106—22)

This invention is for improvements in or relating to resinous compositions, and relates in particular to a new flexible binding material comprising a condensation product of a phenol and acetaldehyde or paraldehyde suitable as a varnish or for preparing moulded articles in which the binding agent requires to be, to some extent, flexible.

It is well known that acetaldehyde forms with phenols resinous condensation products which are non-reactive in character, but which, if the condensate is subsequently treated with formaldehyde, hexamethylenetetramine or similar agents can be endowed with hardening capacity.

It has now been found that if the non-reactive phenol acetaldehyde resin is dissolved by heating in a fatty oil and the heating is continued, the viscous solution is ultimately converted into a product which on cooling is clear, hard and brittle.

Accordingly the present invention comprises preparing a resinous product by heating a phenol-acetaldehyde condensation product or ingredients capable of forming said condensation product with a fatty oil (for example tung oil) until the viscous liquid product first formed becomes clear and brittle on cooling.

The brittle resinous product so formed is soluble in the usual hydrocarbon solvents and in mixtures of alcohol with benzol, xylol and like cyclic hydrocarbon solvents and is in a non-reactive condition but may be rendered reactive by the addition of a methylene-containing hardening agent.

The invention also includes varnishes comprising the resinous product above described with or without a hardening agent.

The resinous product hereinbefore described is peculiarly suitable for varnishes on account of its flexibility and when the resinous product is heated with a hardening agent, such as hexamethylenetetramine, a product is obtained which is hard and infusible, but which is characterized by flexibility so that where a stoving varnish is required the resinous product is dissolved in a solvent together with the hardening agent. Such a varnish combines the advantages of the ordinary phenol-formaldehyde resin varnish in its excellent stoving qualities with the flexibility of oil varnishes. Air drying varnishes, can, however, be made by incorporating the usual driers, such as cobalt linoleate with the resinous product without a hardening agent.

It is sometimes desirable to produce moulded articles with increased flexibility, for instance when moulding around a metallic core and particularly when such a moulded article is to be subjected to fluctuations in temperature after moulding and in this connection various flexible moulding mixtures, including phenol-fatty oil condensation products hardened with a methylene-containing hardening agent have been proposed.

The present invention also comprises mouldable compositions or laminated stock comprising as binding agent the phenol-acetaldehyde-oil product above described in association with a methylene-containing hardening agent. Such moulding mixtures are characterized by the ease with which they are moulded and the short time required to obtain the requisite hardness. The moulded articles are characterized by hardness and flexibility.

The moulding mixtures comprising as binder the phenol-acetaldehyde-oil product prepared in accordance with this invention are suitable for all moulding powders requiring flexibility, such as the handles of cooking utensils which are made by moulding the material around a metallic core.

The following examples illustrate the manner in which the invention may be carried into effect both for the purpose of preparing stoving varnishes and air-drying varnishes and also for the preparation of moulding mixtures.

Example No. 1

| | Parts by weight |
|---|---|
| Phenol-acetaldehyde resin | 500 |
| Tung oil | 500 |

The above mixture is heated at 200° C. until a sample, on cooling remains clear and is hard and brittle. Suitable solvents, such as benzol, toluol, solvent naphtha, etc. are added to give a varnish of the required viscosity and a drier is added to the solution, for example—cobalt linoleate 2.5 grams. The varnish on application gives hard, lustrous and durable films.

In an alternative procedure a methylene-containing agent, such as hexamethylenetetramine may be added instead of the cobalt linoleate, giving as product a stoving varnish suitable for coating compositions and impregnating solutions where extremely durable and heat-resistant products are required.

Example No. 2

| | Parts by weight |
|---|---|
| Phenol-acetaldehyde resin | 500 |
| Linseed oil | 100 |

The mixture is maintained at a temperature of

200° C. for 25 minutes resulting in a clear, hard resin which may be incorporated with fibrous material (together with hardeners, lubricants, colouring matter, etc.) to give mouldable compositions or may be dissolved in suitable solvents as in the previous example.

*Example No. 3*

|  | Parts by weight |
|---|---|
| Phenol | 940 |
| Paraldehyde | 440 |
| Tung oil | 300 |
| Hydrochloric acid (conc.) | 10 |

The mixture is boiled under a reflux condenser for 3-4 hours and then heated up to 200° C. for one hour in an open pan, when the product takes the form of a clear hard resin.

*Example No. 4*

|  | Parts by weight |
|---|---|
| Phenol-acetaldehyde resin | 500 |
| Tung oil | 200 |

The mixture is heated to 200° C. Complete solution is effected in about one hour but heating is continued until a sample on cooling is clear, hard and brittle.

The resinous material is then incorporated with a fibrous filling material and a methylene containing agent such as hexamethylenetetramine.

|  | Parts by weight |
|---|---|
| Resin (made as described above) | 100 |
| Wood meal | 110 |
| Hexamethylenetetramine | 8.6 |

Lubricants, colouring matter, plasticizers, etc. may be added if desired. This mixture, when subjected to the action of heat and pressure, gives moulded articles possessing marked flexibility.

The fibrous filler, instead of being in the loose form, such as wood meal, paper pulp, asbestos fibres, may be used in sheet form as paper, woven textile fabric, sheet asbestos, etc. In such cases the binder is preferably employed in solution as, for instance, in a mixture of benzol and alcohol. The sheet fibrous material is impregnated with the resin solution, the solvents being subsequently dried off. The impregnated sheet may be heat-hardened or a number of sheets superimposed and the stack subjected to the combined action of heat and pressure. The laminated stock resulting is again characterized by superior flexibility.

Instead of condensation products of phenol and acetaldehyde, resins may be used made from any other phenol condensed with acetaldehyde or its polymers. Linseed or other fatty oil may be substituted for the tung oil given in the examples.

I claim:

Process for preparing a composition moldable under the action of heat and pressure into an infusible article characterized by flexibility which comprises heating a phenol-acetaldehyde condensation product with a fatty oil until the viscous liquid first formed becomes clear and brittle on cooling, and mixing the resinous product so formed with a filler and a hardening agent for reacting with the resinous product when subjected to the action of heat in a molding operation.

STANLEY ERNEST CHUBB.